Figure 1:
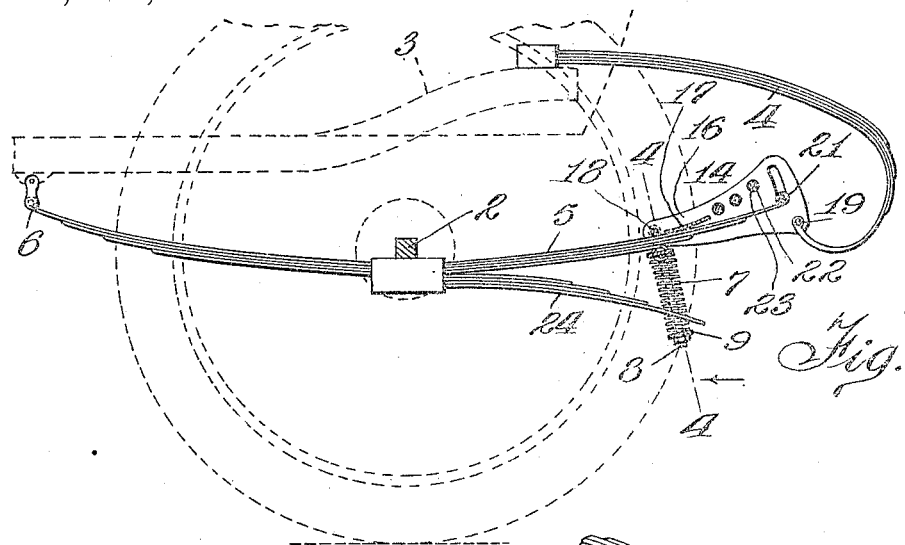

F. H. HOPKINS & G. B. DOREY.
VEHICLE SPRING.
APPLICATION FILED OCT. 30, 1914.

1,210,941.

Patented Jan. 2, 1917.

WITNESSES

INVENTORS
FRANK HARTWELL HOPKINS
GEORGE BINET DOREY
BY ATTORNEY

UNITED STATES PATENT OFFICE.

FRANK HARTWELL HOPKINS, OF WESTMOUNT, AND GEORGE BINET DOREY, OF MONTREAL, QUEBEC, CANADA.

VEHICLE-SPRING.

1,210,941.  Specification of Letters Patent.  Patented Jan. 2, 1917.

Application filed October 30, 1914. Serial No. 869,449.

*To all whom it may concern:*

Be it known that we, FRANK HARTWELL HOPKINS, a resident of Westmount, Province of Quebec, Canada, and GEORGE BINET DOREY, a resident of Montreal, Province of Quebec, Canada, both subjects of the King of Great Britain, have invented certain new and useful Improvements in Vehicle-Springs, of which the following is a full, clear, and exact description of the same.

This invention relates to springs for use especially in connection with vehicles and for the purpose of neutralizing shocks and absorbing vibrations to which the vehicle may be subjected, the construction illustrated by way of example in the accompanying drawings being particularly applicable to the spring suspension of automobiles.

The difficulty of providing a spring device which, while being sufficiently stiff to constitute an adequate support and take up heavy shocks, is also of proper flexibility to absorb minor vibrations, has been overcome in a degree by the combination of springs of different strengths. The disadvantage of these compound spring devices is that, being adjusted to meet certain conditions as to load and shock, the true efficiency is only obtained under such conditions and it is an object of the present invention to provide an improved compound spring device and one for overcoming the above mentioned disadvantage by automatically adjusting the tension of the springs as the load and shock vary.

The above with additional objects and advantages will be hereinafter more fully described and particularly pointed out in the appended claims.

Figure 2:
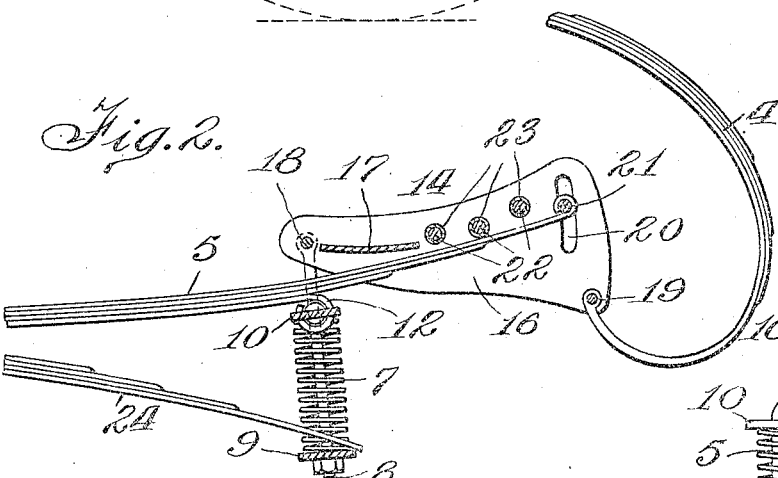
Figure 4:
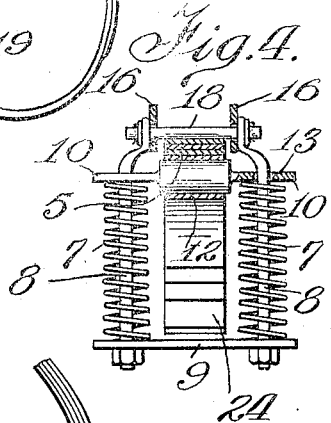
Figure 3:
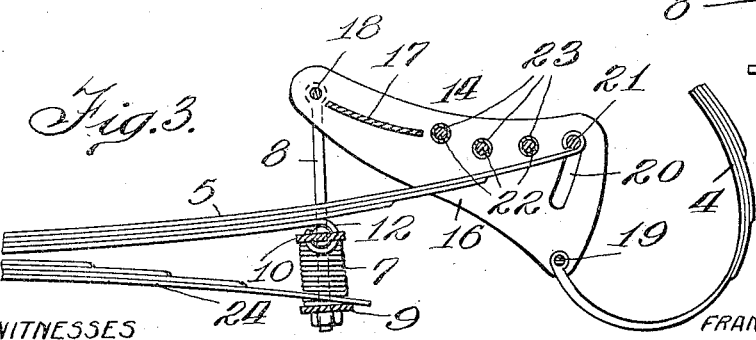

For full comprehension, however, of our invention reference should be had to the accompanying drawing forming a part of this specification, in which similar reference characters indicate the same parts and wherein:

Figure 1 is a sectional view of our improved shock absorber as applied to a vehicle, the section being taken in the longitudinal line of the latter; Figs. 2 and 3 are enlarged fractional views illustrating different positions of the device; and Fig. 4 is a transverse section on line 4—4 Fig. 1.

In the drawings 2 indicates the rear axle of a vehicle and 3 the body portion which is outlined in dotted lines.

Between the body 3 and axle 2 and respectively carried by such members are springs or other elastic mediums of different strengths, connected together and caused to co-act through the medium of a differential lever arrangement which automatically adjusts the springs in accordance with road conditions and load as will be presently fully described.

Although any suitable detail construction may be utilized, our preferred construction consists of a downturned laminated spring 4 extending rearwardly from the body and a helical spring device carried by the axle through an arm connected to the latter and consisting in this instance of an upturned longitudinally extending laminated spring 5 opposed to spring 4, connected between its ends to the axle and linked at its front end to the body at 6.

The helical spring device consists of a pair of springs 7 encircling bolts 8 and bearing between a bottom plate 9 and a top rod 10 located beneath spring 5 and having one leaf of the latter clasping it as at 12 between its ends. The plate 9 is secured by nuts to the lower ends of the bolts and rod 10 has holes 13 therein at the sides of the spring 5, through which holes the bolts loosely pass to positions on opposite sides of and above the spring, the upper ends of such bolts being pivotally connected to a lever 14 which bears upon the top of spring 5 and has its rear end pivotally connected to the body spring 4. The shocks sustained by the axle and spring 5 are transmitted to the helical springs through the lever 14, the front end of which latter being at such times caused to rise and compress the springs 7, said lever having a shifting fulcrum and being adapted to automatically change its bearing point to vary, in accordance with varying conditions, the leverage exerted upon the helical springs.

The differential lever as illustrated consists of a pair of side members or plates 16 connected by a transversely extending web 17 located above the spring 5 and presenting a lower convexed surface, the pivotal connection between the front ends of the side plates and the upper ends of the bolts 8 being secured by a pin 18 which passes across the top of spring 5 and through alined eyes in the connected members. The rear ends of the side plates are preferably enlarged and support near the bottom a pin 19 to which the body spring is connected, the upper portions of such enlarged ends each being formed with a slot 20 curved concentrically with pin 18 and accommodating one end of a pin 21 carrying the rear end of spring 5.

Upon the occurrence of slight vibrations the lever 14 rocks upon the convex surface of the web 17 and raises the front end of the lever thus lightly compressing the helical springs, but under more severe shocks or when an increased load is being sustained the lever rocks until one of a series of rollers 22 is brought into contact with the abutment constituted by spring 5. The rollers are mounted upon pins 23 connected to the plates, placed at varying distances above the spring and disposed in a line extending rearwardly from the web 17 and curving upwardly away from the abutment thus combining with the web 17 to form a convex bearing surface for the lever so that as the lever is rocked upwardly the fulcrum point is correspondingly moved away from the front end of the lever to increase the leverage in proper degree to absorb the increased shock.

The rollers 22 act independently of each other and provide separate fulcrum points in accordance with conditions and effectively avoid the possibility of stiff spring suspension for the reason that as each of the rollers engages with the abutment and provides for the necessary resiliency of the springs a rolling movement is permitted around the fulcrum point proper constituted by the pin 23 thus permitting a certain free movement of the lever which enables the springs to give under the vibrations of the vehicle without altering the tension of the springs when the load or shock conditions remain unchanged.

The minor shocks are taken up by the springs 7 but I have provided a downturned laminated spring 24 opposed to spring 5 and which is secured to the axle 2 and extends rearwardly therefrom between the springs 7 and spaced a short distance above plate 9 when in its normal position so that as conditions call for greater spring tension and the leverage increases, plate 9 will be drawn up against the spring 24, the latter and spring 5 drawn toward each other and the resistance of the helical springs augmented. The spring 24 and the contacting surfaces of the spring 5 and lever 14 serve to dampen the recoil of the springs.

As the load increases owing to a more violent shock or greater weight in the vehicle and the lever rocks and shifts its fulcrum rearwardly along spring 5, the load upon springs 4 and 5 is increased and that upon springs 7 and 24 correspondingly decreased until such time as the load increases beyond that to which the latter springs are adjusted, when the downward movement of the rear end of the lever brings the tops of the slots 20 into engagement with pin 21 and provides a direct shackle between springs 4 and 5 whereby these stiffer springs take up the entire load.

From the foregoing it will be seen that the tension of the springs is automatically increased as the load placed thereon becomes greater and obviously as the load decreases and under all fluctuations thereof the spring tension will be likewise varied in the proper degree.

What we claim is as follows:

1. The combination with a pair of relatively movable parts, of springs carried respectively by said parts and a lever having a shifting fulcrum and connecting the springs, such lever including a series of elements movable with relation to the lever and constituting fulcrum points for the latter.

2. The combination with a pair of relatively movable parts, of a spring connected to one of said parts and a lever connected to the other of said parts and to the spring, the lever including a series of elements movable with relation to the lever and constituting fulcrum points for the latter.

3. The combination with a pair of relatively movable parts, of a laminated spring carried by one of the parts, a helical spring carried by the laminated spring, a plate located at each side of the laminated spring and connected to the helical spring, a pin and slot connection between the plates and laminated spring, a web extending across the laminated spring and connecting the plates, a series of rollers extending between the plates, such web and rollers being adapted to successively bear upon the laminated spring and normally extending in a curved line outwardly from the latter and connecting means between the plates and the other movable part.

4. The combination with a pair of relatively movable parts, of a laminated spring carried by one of the parts, a helical spring carried by the laminated spring, a plate located at each side of the laminated spring, and connected to the helical spring, a pin and slot connection between the plates and laminated spring, a web extending across the laminated spring and connecting the plates, a series of rollers extending between the plates, such web and rollers being adapted to successively bear upon the laminated spring and normally extending in a curved line outwardly from the latter and a second laminated spring connecting the plates and the other movable part.

5. In a vehicle, the combination with the body thereof and the axle, of a spring carried by the body, a spring carried by the axle and a lever having a shifting fulcrum and connecting the springs, such lever causing the springs to co-act one with the other and being adapted to vary the tension of same as the fulcrum shifts.

6. The combination with a pair of relatively movable parts, of a spring carried by one of said parts, a second spring carried by the first, a third spring carried by the other of said parts and a lever connecting the second and third springs and having a shifting fulcrum upon one of said springs.

7. The combination with a pair of relatively movable parts, of a spring carried by one of said parts, a second spring carried by the first and a lever connected at one end with the second spring and at the opposite end with the other of said movable parts, such lever having a shifting fulcrum upon the first mentioned spring.

8. The combination with a pair of relatively movable parts, of a pair of opposed spring elements carried by one of said parts and a lever having a shifting fulcrum, being connected at one end to the other of said parts and at the opposite end to one of said opposed spring elements and adapted to bear upon the other spring element.

9. The combination with a pair of relatively movable parts, of a lever having a shifting fulcrum and being connected to one of the parts, an abutment for the lever connected to the other part and a combination of a helical spring and a laminated spring yieldingly resisting the rocking of the lever and maintaining same in normal position.

10. The combination with a pair of relatively movable parts, of a laminated spring carried by one of said parts, a helical spring carried by said laminated spring, a lever having a shifting fulcrum, being connected at opposite ends to said helical spring and the other of said parts and adapted to bear upon said laminated spring, and a pin and slot connection between the lever and laminated spring.

11. The combination with a pair of relatively movable parts, of a spring connected to one of the parts, a lever having a shifting fulcrum, being connected to the other part and adapted to act upon the spring in proportion to the relative movements of the parts and an abutment for the lever, such lever including a series of rollers carried between the ends of the latter, spaced longitudinally thereof and at varying distances from the abutment upon which they are adapted to successively bear.

12. In a vehicle, the combination with the body portion and the axle, of an upturned laminated spring carried by the axle and extending longitudinally of the vehicle with its forward end linked to the body portion, a pin carried at the rear end of the spring, a bar secured beneath the spring, bolts passing loosely through the bar at opposite sides of the spring, a plate carried by the bolts and spaced from the bar, helical springs encircling the bolts and bearing between the plate and bar, a downturned laminated spring carried by the axle and extending rearwardly of the latter between the helical springs and spaced above said plate in its normal position, rearwardly extending plates at the sides of the upturned spring and pivotally connected near one of their ends and above said bar, to the bolts, the opposite ends of such plates having slots therein curved concentrically with such pivots and accommodating the pin carried by the upturned laminated spring, a web extending between and connecting the plates, such web being curved away from and adapted to bear upon the upper surface of the upturned spring, a series of rollers carried by said plates and extending rearwardly from the web in a line curving away from the spring and a downturned laminated spring carried by the body portion of the vehicle and pivotally connected to the rear ends of said plates.

13. The combination with a pair of relatively movable parts, of a laminated spring carried by one of the parts, a lever having a shifting fulcrum and being connected to one end of the laminated spring and a coiled spring carried by the other of the parts and yieldingly resisting the action of the lever.

14. In a vehicle, the combination with the body and the axle, of a spring adapted to transmit the load from one to the other of said vehicle parts, a lever attached to one end of the spring and having different operative fulcrum points extending from the power end of the lever and an elastic medium resisting the action of the lever.

15. In a vehicle, the combination with the body and the axle, of a pair of springs adapted to transmit the load from one to the other of said vehicle parts and a lever having a changing fulcrum point, connecting the springs and acting upon one of said springs, the other of said springs permitting a movement of the vehicle body independently of the movement of the lever.

16. In a vehicle, the combination with the body and axle, of a spring connected to the body, a spring connected to the axle and a lever connected to one of the springs and bearing upon the other of said springs, the bearing point of the lever upon said spring being movable with relation to the spring.

In testimony whereof, we have signed our names to this specification, in the presence of two subscribing witnesses.

FRANK HARTWELL HOPKINS.
GEORGE BINET DOREY.

Witnesses:
STANLEY C. KING,
JAMES C. FRASER.